Nov. 27, 1934. L. J. KUEHN 1,982,310

BIFOCAL LENS

Original Filed June 22, 1928

Inventor

Lawrence J. Kuehn

By Wheeler, Wheeler & Wheeler
Attorneys

Patented Nov. 27, 1934

1,982,310

UNITED STATES PATENT OFFICE 1,982,310

BIFOCAL LENS

Lawrence J. Kuehn, Milwaukee, Wis.

Original application June 22, 1928, Serial No. 287,587. Divided and this application September 27, 1929, Serial No. 395,579

5 Claims. (Cl. 88—54)

This invention relates to improvements in bifocal lenses.

Lenses are ground on rotatable wheels or cutters and, in order to produce desired optical effects, it has heretofore been considered essential to permit the lens to rotate freely on its axis during the grinding operation. In preparing bifocal lenses, for example, it has heretofore been customary to hold the convex spherical surface of a lens blank eccentrically upon the opposing convex surface of a spherical metal head to which an abrasive compound is applied as the head revolves. The rotation of the head tends to produce rotation of the lens blank held thereto with the result that a concave depression is formed in the otherwise convex surface of the lens blank.

Because of the necessity of producing a full circular or crescent shaped depression by the methods of lens grinding heretofore employed in the production of bifocal lenses, the result has often been to deprive the wearer of a spectacle equipped with such lenses of the benefit of distant vision through the lower part of his lenses. It will be obvious that the purpose of enabling the wearer to view objects near at hand may be adequately served by the provision of a short focus band which is relatively narrow vertically. Methods of grinding heretofore known, however, have necessarily produced a circular or crescent shaped short focus area which, in the completion of the lens, is usually intersected by the finished line of the lower lens margin whereby there is no long focus portion of the completed lens remaining at the bottom of such lens. The lack of such a long focus portion prevents the wearer of spectacles or glasses so made from seeing the pavement upon which he is walking and renders blurred and substantially invisible to him the ground upon which the wearer alights from a street car or other vehicle.

I am aware that attempts have been made to remedy this difficulty by grinding supplemental lenses for near vision which are fixed by cement to the outer surface of a spectacle lens at such a location as not to interfere with distant vision through the bottom of the principal lens. The obvious defect in such devices, however, consists not only in their relatively unsightly appearance but also in the fact that the cement is apt to yield or break and thereby permit the supplemental lens to fall off.

It is the purpose of the present invention to provide a bifocal lens in which an insert is fused into the main lens to provide a near vision area in a band which is narrow in a vertical direction but is of sufficient breadth horizontally to permit adequate short focus vision. It is my further purpose to accomplish these results while avoiding an unsightly marginal shoulder between the near focus area of the completed lens and the distant focus area thereof. It will be observed that the fusing of the glass eliminates the possibility of displacement of the near focus insert and is accomplished by the method hereinafter disclosed without leaving the line of demarcation between the respective near focus and distant focus areas more apparent than is the case in ordinary bifocal lenses. In other words it is practically invisible except upon close inspection.

The curvature of the entire insert about a point below the lens results in affording a maximum area of distant focus lens below the area adapted for short focus work.

In the drawing.

Like parts are identified by similar reference numerals throughout the several views.

Figure 1:
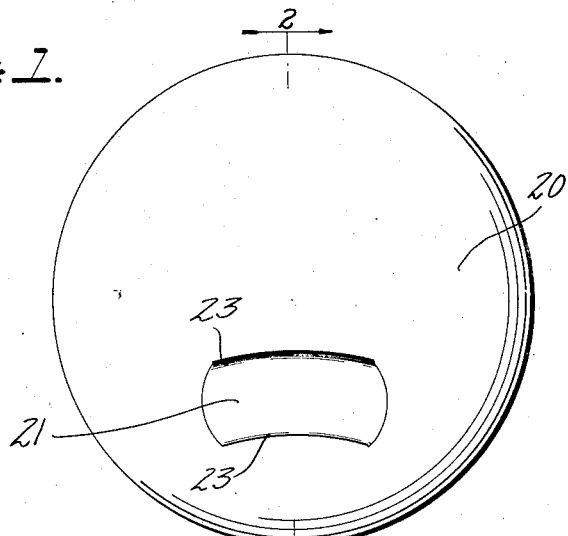
Figure 1 is a plan view of a lens blank ground for the reception of a short focus insert in accordance with this invention.
Figure 2:
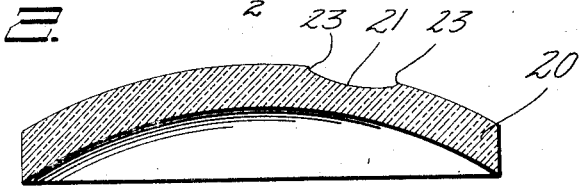
Figure 2 is a view of the blank taken in section in the plane indicated by the line 2—2 in Fig. 1.

A suitable tool and process for the manufacture of a lens embodying this invention are disclosed in my copending application 287,587, of which this is a division.

The lap or tool employed for the grinding operation is provided with an annular grinding surface of spherical contour which traverses the lens blank 20 while such blank is held stationary. The grinding operation is preferably conducted until the recess 21 formed in the blank has been carried to such a depth as to provide rather abrupt shoulders 23 at its side margins. The recess 21 is spherically bottomed due to the spherical contour of the lap, and it will be noted that the recess is transversely elongated and of substantially uniform vertical width.

The insert 25 is now fused into the recess, which it completely fills, merging with the bottom and shouldered sides thereof. Finally the projecting portion 28 of the insert is ground away and the insert and lens blank are preferably concurrently ground to final form in which the grinding is conducted to such a depth as to eliminate substantially completely the shoulders 23 and to leave the surface of the insert and the surface of the lens continuous and optically identical, the different index of refraction of the insert being wholly relied upon for the different optical effect produced thereby.

Figure 3:
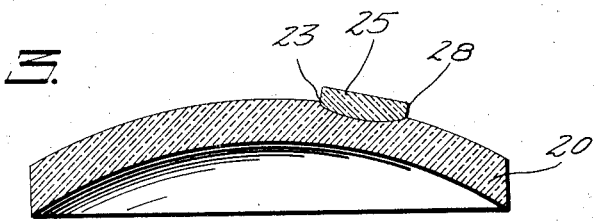
Figure 3 is a view similar to Fig. 2 showing the insert in place in the depression ground in the lens blank.
Figure 4:
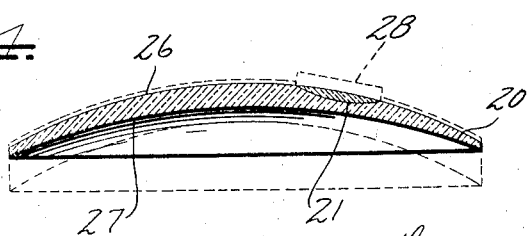
Figure 4 is a view similar to Figs. 2 and 3 illustrating the form of the completed lens after the final grinding operation which has shaped the lens to the desired curvature.

The optical qualities of the completed distant focus lens have considerable variation for different users but there are comparatively few curvatures used in the short focus inserts. For this reason, it is possible to make up in large quantities such partially completed lenses as are shown in Fig. 3, reserving the final grinding operation to satisfy the particular optical prescription of the customer.

The lens blank is preferably made of crown glass and the insert of flint glass in order to permit the fusing operation as above described to be carried out without destroying the lens blank. The bottom of the insert is of predetermined spherical curvature and the principal lens and exposed part of the insert are finished, preferably convexly, to predetermined form.

The disposition of the insert in spaced relation to the bottom of the principal lens and upwardly bowed from the bottom portion of the principal lens provides ample area for downward distant vision so that the wearer of a lens constructed in accordance with this invention can guide his steps with certainty to substantially the degree which would be possible if the bifocal insert were absent.

I claim:

1. A lens comprising an optical member having a substantially spherical convex face provided with a laterally elongated substantially spherical concave recess intersecting said face substantially without shoulders upon spaced concentric arcuate lines on two sides and intersecting lines at the ends of said recess, and a supplementary lens member having surfaces complementary to the surfaces of said recess secured thereto and having its exposed surface finished in substantial conformity with the said convex face of said first mentioned member, said recess and supplemental member being wholly spaced from the margins of said first mentioned member and surrounded by integral portions thereof.

2. A lens comprising a first optical member having a convex face spherically recessed intermediate its margins and an optical insert complementary to said recess and fused therein, said recess having spaced concentric margins drawn about an axis outside of said member and intersecting the convex surface of said member substantially without shoulders.

3. A lens comprising an optical member having a substantially spherical convex face provided wholly intermediate its margins with a substantially spherical concave recess intersecting said face substantially without marginal shoulders upon marginal lines concentrically drawn about an axis outside of the area of said member, the ends of said recess being bounded by lines distinct from said marginal lines at the intersection of the spherical surface of the recess with the spherical face of said member, and an optical insert having surfaces complementary to said recess fused thereto and externally finished substantially in conformity with the spherical face of said member.

4. A lens comprising an optical member having a convex face spherically recessed intermediate its margins, and an optical insert complementary to said recess and fused therein, said recess having spaced concentric margins drawn about an axis outside of said member and intersecting the convex surface of said member substantially without shoulders, the ends of said recess being spaced from the sides of said member.

5. A lens comprising an optical member having a concave recess in a convex face and having a concave recess in said face spaced at all points from the margin thereof and bounded by arcuate lines curvilinear toward that side of the optical member to which said recess is closest, the ends of the recess being bounded by lines distinct from said marginal lines at the intersection of the surface of the recess with the face of said member, and an optical insert having surfaces complementary to said recess optically mounted therein and externally finished substantially in conformity with the convex face of said member.

LAWRENCE J. KUEHN.